Patented Apr. 10, 1951

2,548,282

UNITED STATES PATENT OFFICE 2,548,282

POLYMERIZING ACRYLONITRILE IN THE PRESENCE OF ALKALI METAL SOAP OF MAHOGANY ACIDS

Costas H. Basdekis, Dayton, Ohio, assignor to Monsanto Chemical Company, St. Louis, Mo., a corporation of Delaware No Drawing. Application June 25, 1949, Serial No. 101,489

16 Claims. (Cl. 260—85.5)

This invention relates to a new method of preparing valuable polymers of acrylonitrile. More specifically the invention relates to an efficient and practicable process for preparing uniform fiber forming polymers of 92 to 100 percent acrylonitrile and up to eight percent of another copolymerizable monomer.

Polyacrylonitrile and copolymers of acrylonitrile and other polymerizable olefinic monomers are well known to the art. Many useful methods have been proposed for their manufacture. If the acrylonitrile polymers are to be used in the fabrication of synthetic fiber many of the proposed methods are impracticable because of the non-uniformity of the physical and chemical properties of the polymer, and the discoloration inherent in the method of manufacture. Furthermore, many of the prior art methods require the use of high water-monomer ratios in order to maintain a sufficiently fluid condition in the reaction mass to assure adequate heat transfer. Attempts to reduce the water-monomer ratios have been made by reducing the catalyst concentration, but such methods usually retard the polymerization and little or no economy of operation is effected. Other prior art methods of operation have achieved only partial success because of the loss of yield, the increase in reaction period or the increase of the impurities in the polymer.

The primary purpose of this invention is to provide an efficient polymerization process whereby a high yield of a uniform and pure product is formed. A further purpose of this invention is to provide a method of preparing a copolymer by the aqueous technique, requiring the minimum proportion of water in the reaction mass. A further purpose of this invention is to provide a uniform film-forming acrylonitrile polymer.

In copending application Serial No. 5,482, filed January 30, 1948, by George E. Ham, there is described and claimed a method of preparing copolymers of acrylonitrile and vinyl acetate of substantially uniform chemical and physical properties by mixed monomer addition at constant reflux temperature. This method produces a uniform polymer but generally requires the use of water to monomer ratios from four to eight, depending upon the degree of subdivision of the polymer, which in turn is dependent upon the rate of monomer addition, efficiency of the stirring mechanism and temperature of operation. Methods of preparation with lower monomer to water ratios are desired in order to increase the polymer production capacity without increasing the investment in polymerization reactors. Optimum methods should utilize low water to monomer ratios, substantially one hundred percent yield, and short reaction periods.

It has now been found that by the proper selection of reaction conditions the desired objective can be achieved. In the new method the selection of the stabilizing agent, the polymerization catalyst, and the proportions of both stabilizer and catalyst are of critical importance. The new method is conducted by adding the acrylonitrile, or the mixture of acrylonitrile and other polymerizable monomers, gradually to a polymerization reactor containing water, dispersing agent, and catalyst, which reactor is maintained under proper conditions for polymerization. This method is useful in the preparation of polyacrylonitrile and copolymers of 92 to 100 percent acrylonitrile and up to eight percent of another polymerizable monomer, such as vinyl acetate and other vinyl esters of aliphatic monocarboxylic acids, methyl methacrylate and other alkyl esters of methacrylic acid, ethyl acrylate and other alkyl esters of acrylic acid, styrene and other vinyl substituted aromatic hydrocarbons, and vinylidene chloride.

As the stabilizing agent, the new method involves the use of an alkali metal mahogany soap, which is a mixture of oil soluble salts of sulfonic acids of petroleum, derived as a by-product from the sulfuric acid refining of petroleum. The sodium salts are most useful. From 0.05 to 0.20 percent of the stabilizer based on the weight of the monomers to be charged will produce the desired result, and the optimum concentration is between 0.08 and 0.15 percent. The stabilizer may be charged to the polymerization reactor at the beginning of the reaction or it may be added continuously or periodically throughout the course of the reaction in order to achieve the desired state in the reaction mass. A preferred class of mahogany soaps are those which have an alkyl radical containing from 20 to 30 carbon atoms.

The new reaction is catalyzed by means of an alkali metal persulfate, preferably potassium persulfate, which is used to the extent of 0.5 to two percent by weight of the monomer to be polymerized. The optimum catalyst concentration is from 0.08 to 1.5 percent, when the conditions of reaction are such as to utilize the catalyst efficiently. The reaction may be conducted by adding the catalyst to the aqueous medium prior to the introduction of monomer, but preferred operation utilizes a continuous or periodic addition of the catalyst so as to maintain approximately a uniform concentration in the reaction mass throughout the course of the reaction.

The new method, if desired, utilizes a conventional molecular weight regulator, for example t-dodecyl mercaptan and carbon tetrachloride, which may be added at the beginning of the reaction or during the reaction. Preferred operation utilizes a small concentration of catalyst, dispersing agent, and if desired, the regulator in the aqueous medium at the beginning of the reaction. The additional catalyst, dispersing agent and regulator are added continuously throughout the reaction by means of a suitable metering device for adding the agents at a uniform predetermined rate. The reaction is conducted at a temperature between 65° C. and 85° C. and is coordinated so that the reaction will be substantially completed when all of the desired lot of monomers have been added to the reaction mass. The rate of addition is fixed so that it will be completed within a desirable short reaction period, for example one to four hours. The reaction is controlled by the rate of addition of the monomer and the temperature is preferably the reflux temperature for the reaction mass. Under such conditions slight fluctuations of the temperature of reflux may occur as the reaction proceeds.

The new method may also be operated by maintaining a constant reflux temperature and adding the monomers at a variable rate as is required in order to maintain the reflux temperature constant at all times. This manner of operation is described in copending application Serial No. 5,482, referred to above.

In the practice of this invention prior to the introduction of the acrylonitrile, or mixture of acrylonitrile or other monomers, the water charged to the reactor is heated to approximately the temperature to which the polymerization is expected to proceed. The monomer stream then is introduced and the agitation begun. Almost immediately the reaction mass begins to boil, the evolved vapors being condensed and returned to the reactor. The reflux temperature may then be maintained by regulation of the monomer addition, or the reflux temperature may be permitted to seek its own level by continuing the monomer addition at a constant rate. In either case desirable fiber forming copolymers are obtained, but one or the other of these methods may be preferred under varying conditions of operation.

In the preparation of acrylonitrile copolymers the rate of polymerization of the acrylonitrile and other monomers will not be identical, and therefore one or the other may copolymerize more rapidly. The monomers, will however, combine in a fixed proportion which bears a definite relationship to the proportions of monomer in the reaction mixture. Thus, if a polymer of a uniform fixed monomer ratio is desired it will be necessary to maintain the proportions of monomers in the reaction mass substantially uniform throughout the reaction period. This condition is not always easily attained since it requires the pre-determination of the relationship between proportion of monomer in the reaction mass and the proportion of monomer polymerizing. An approximation of the ideal conditions may be obtained by charging the monomers in the ratios desired in the ultimate polymer. Under such conditions the first increment of polymer will be slightly different from that desired, but each successive increment will approach the desired proportions as the monomer proportions in the reaction mixture adjust themselves to that ratio which will produce the desired ultimate polymeric composition.

If desired, the ideal conditions of operation may be attained by initially charging to the reactor monomers in the proportion which will produce the desired ultimate copolymer, and thereafter charging the monomers in the proportions desired in the ultimate copolymer. Such operations will insure copolymers of the desired proportions throughout the entire reaction.

After all of the monomer charge has been added to the reactor it will be apparent that some unreacted monomers will still be present. Obviously if the polymerization continues, polymers of the desired composition cannot be formed, since the reaction mixture will become depleted with respect to the more reactive monomers. Thereafter the polymer composition will change in accordance with the changes in the proportion of monomers in the unpolymerized monomer. In order to avoid this changing proportion of monomer in the reaction mixture it is desirable to interrupt the polymerization as soon as the last increment of monomer has been added. This interruption may be achieved by destroying one or more of the essential conditions of polymerization, for example by reducing the temperature, by adding a polymerization inhibitor, by rapid steam distillation of the mass to eliminate unreacted monomers, or by precipitation of the emulsion, by rapid stirring, freezing, or the addition of alcohol or an electrolyte.

The emulsion polymerizations are preferably conducted in glass or glass-lined steel vessels, which are provided with efficient means for agitation. Generally rotary stirring devices are more desirable, but other means for insuring intimate contact of reagents may be employed successfully, for example by rocking or tumbling the reactor. The polymerization equipment generally used is conventional in the art and may be varied to suit the type of reaction contemplated. Generally semi-continuous operation is preferred, that is, where a fixed lot of monomer is polymerized by continuous addition to the reactor and the entire charge removed when the reaction is completed. Fully continuous operation, wherein a portion of the polymer is periodically or continuously removed, may also be utilized. It is, however, essential in the practice of this invention that the proportions of suspending agent, catalyst, water and monomer be maintained.

Further details in the practice of this invention are set forth with respect to the specific examples.

Example 1

A glass reaction vessel, provided with a rotary stirrer, a thermometer and a reflux condenser was charged with 750 grams of water and 0.45 gram of a sodium salt of mahogany acids. The solution was heated to 80° C. and a previously prepared 450 gram mixture of 95 percent acrylonitrile and five percent vinyl acetate were added gradually over a period of two hours. A solution of 4.5 grams of potassium persulfate, dissolved in 150 cc. of water was added gradually throughout the reaction. The rotary stirrer was operated at approximately 200 R. P. M. and the reaction was maintained at the reflux temperature of 68.5 to 80° C. throughout the reaction. After the polymerization had been completed the mixture was steam distilled to remove unreacted monomer. The copolymer was a fine suspension which was readily filtered and thereafter dried for twelve hours at 70° C. A conversion of 98 to 99 percent was obtained. The specific viscosity of the copolymer was measured by dissolving one-tenth of one percent by weight in dimethylformamide and found to be 0.40.

*Example 2*

The procedure of the preceding example was repeated, except that 0.3 percent by weight of t-dodecyl mercaptan was charged to the reaction vessel. This polymer was found to have a specific viscosity of about 0.3.

*Example 3*

The procedure of Example 1 was repeated, except that the catalyst was added in equal increments every fifteen minutes throughout the two hour reaction period. The polymer formed was identical to that prepared by Example 1.

*Example 4*

The procedure of Example 1 was repeated, except that all of the catalyst solution was added at the beginning of the reaction. A very desirable fiber forming copolymer was obtained.

*Example 5*

The procedure of Example 1 was repeated, except that the mixture of monomers charged consisted of 92 percent by weight of acrylonitrile and eight percent of vinyl acetate.

*Example 6*

Two additional preparations were made utilizing different stirring speeds. At 450 R. P. M. smaller size particles were obtained, but not essentially different in polymer properties. At 125 R. P. M. larger particle sizes were obtained but the polymer still had desirable fiber forming properties.

*Example 7*

A series of preparations were made using procedure identical to that described in Example 1, except that water-monomer ratios were varied. The following table sets forth the relationship between the water-monomer ratios and the percent of moisture found in the polymer immediately after being filtered.

| Water/Monomer Ratio | Percent Moisture in Filtered Polymer |
|---|---|
| | *Per cent* |
| 10/1 | 85 |
| 7/1 | 80 |
| 5/1 | 60 |
| 3/1 | 55 |
| 2/1 | 45–50 |

This indicates that under the defined critical conditions, operation at the desired low water-monomer ratios results in the formation of a polymer that retains less moisture and therefore is easier and less costly to dry to the desired moisture free condition.

The invention is defined by the following claims.

I claim:

1. A method of preparing a polymer of 92 to 100 percent by weight of acrylonitrile and up to eight percent of another copolymerizable olefinic monomer, which comprises mixing the monomers in the desired proportions and adding them gradually to water at the reflux temperature in the presence of from 0.05 to 0.20 percent by weight of alkali metal soap of mahogany acids, and in the presence of from 0.5 to 2.0 percent by weight of an alkali metal persulfate, said percentages being based on the weight of the total monomers.

2. A method of preparing a polymer of 92 to 100 percent by weight of acrylonitrile and up to eight percent of another copolymerizable olefinic monomer, which comprises mixing the monomers in the desired proportions and adding them gradually to water at the reflux temperature in the presence of from 0.08 to 0.15 percent by weight of alkali metal soap of mahogany acids, and in the presence of from 0.8 to 1.5 percent by weight of an alkali metal persulfate, said percentages being based on the weight of the total monomers.

3. A method of preparing a copolymer of at least 92 percent by weight of acrylonitrile and up to eight percent of vinyl acetate, which comprises mixing acrylonitrile and vinyl acetate in the desired proportions and adding them gradually to water at the reflux temperature, in the presence of from 0.05 to 0.20 percent by weight of alkali metal salt of mahogany acids, and in the presence of from 0.5 to 2.0 percent by weight of an alkali metal persulfate, said percentages being based on the weight of the total monomers.

4. A method of preparing a copolymer of at least 92 percent by weight of acrylonitrile and up to eight percent of vinyl acetate, which comprises mixing acrylonitrile and vinyl acetate in the desired proportions and adding them gradually to water at the reflux temperature, in the presence of from 0.08 to 0.15 percent by weight of alkali metal salt of mahogany acids, and in the presence of from 0.8 to 1.5 percent by weight of an alkali metal persulfate, said percentages being based on the weight of the total monomers.

5. A method of preparing a polymer of 92 to 100 percent by weight of acrylonitrile and up to eight percent of another copolymerizable olefinic monomer, which comprises mixing the monomers in the desired proportions and adding them gradually to from 150 to 400 percent by weight of monomer of water, at the reflux temperature, in the presence of from 0.05 to 0.20 percent by weight of alkali metal salt of mahogany acids, and in the presence of from 0.05 to 2.0 percent by weight of an alkali metal persulfate, said percentages being based on the weight of the total monomers.

6. A method of preparing a polymer of 92 to 100 percent by weight of acrylonitrile and up to eight percent of another copolymerizable olefinic monomer, which comprises mixing the monomers in the desired proportions and adding them gradually to from 150 to 400 percent by weight of monomer of water at the reflux temperature, in the presence of from 0.08 to 0.15 percent by weight of alkali metal salt of mahogany acids, and in the presence of from 0.8 to 1.5 percent by weight of an alkali metal persulfate, said percentages being based on the weight of the total monomers.

7. A method of preparing a copolymer of at least 92 percent by weight of acrylonitrile and up to eight percent of vinyl acetate, which comprises mixing acrylonitrile and vinyl acetate in the desired proportions, and adding them gradually to from 150 to 400 percent by weight of monomer of water at the reflux temperature, in the presence of from 0.05 to 0.20 percent by weight of alkali metal salt of mahogany acids, and in the presence of from 0.5 to 2.0 percent by weight of an alkali metal persulfate, said percentages being based on the weight of the total monomers.

8. A method of preparing a copolymer of at least 92 percent by weight of acrylonitrile and up to eight percent of vinyl acetate, which comprises mixing acrylonitrile and vinyl acetate in the desired proportions, and adding them gradually to from 150 to 400 percent by weight of monomer of water at the reflux temperature, in the presence of from 0.08 to 0.15 percent by weight of alakli metal salt of mahogany acids, and in the presence of from 0.8 to 1.5 percent by weight of an alkali metal persulfate, said percentages being based on the weight of the total monomers.

9. A method of preparing a copolymer of at least 92 percent by weight of acrylonitrile and up to eight percent of vinyl acetate, which comprises mixing acrylonitrile and vinyl acetate in the desired proportions, and adding them gradually at a uniform rate of from 150 to 400 percent by weight of monomer of water at the reflux temperature, in the presence of from 0.05 to 0.20 percent by weight of alkali metal salt of mahogany acids, wherein the alkyl radical has from twenty to thirty carbon atoms, and in the presence of from 0.5 to 2.0 percent by weight of an alkali metal persulate, said percentages being based on the weight of the total monomers.

10. A method of preparing a copolymer of at least 92 percent by weight of acrylonitrile and up to eight percent of vinyl acetate, which comprises mixing acrylonitrile and vinyl acetate in the desired proportions, and adding them gradually at a uniform rate to from 150 to 400 percent by weight of monomer of water at the reflux temperature, in the presence of from 0.08 to 0.15 percent by weight of alkali metal salt of mahogany acids, and in the presence of from 0.8 to 1.5 percent by weight of an alkali metal persulfate, said percentages being based on the weight of the total monomers.

11. A method of preparing a copolymer of at least 92 percent by weight of acrylonitrile and up to eight percent of vinyl acetate, which comprises mixing acrylonitrile and vinyl acetate in the desired proportions, and adding to water at rates which maintain a constant reflux temperature, in the presence of from 0.05 to 0.20 percent by weight of alkali metal salt of mahogany acids, and in the presence of from 0.5 to 2.0 percent by weight of an alkali metal persulfate, said percentages being based on the weight of the total monomers.

12. A method of preparing a copolymer of at least 92 percent by weight of acrylonitrile and up to eight percent of vinyl acetate, which comprises mixing acrylonitrile and vinyl acetate in the desired proportions, and adding to water at rates which maintain a constant reflux temperature, in the presence of from 0.08 to 0.15 percent by weight of alkali metal salt of mahogany acids, and in the presence of from 0.8 to 1.5 percent by weight of an alkali metal persulfate, said percentages being based on the weight of the total monomers.

13. A method of preparing a copolymer of at least 92 percent by weight of acrylonitrile and up to eight percent of vinyl acetate, which comprises mixing acrylonitrile and vinyl acetate in the desired proportions, and adding them gradually to from 150 to 400 percent by weight of water at the reflux temperature, in the presence of from 0.05 to 0.20 percent by weight of alkali metal salt of mahogany acids, and in the presence of from 0.5 to 2.0 percent by weight of a monomer of potassium persulfate, said percentages being based on the weight of the total monomers.

14. A method of preparing a copolymer of at least 92 percent by weight of acrylonitrile and up to eight percent of vinyl acetate, which comprises mixing acrylonitrile and vinyl acetate in the desired proportions, and adding them gradually to from 150 to 400 percent by weight of monomer of water at the reflux temperature, in the presence of from 0.08 to 0.15 percent by weight of monomer of sodium salt of mahogany acids, and in the presence of from 0.8 to 1.5 percent by weight of potassium persulfate.

15. In a method of preparing a polymer of 92 to 100 percent by weight of acrylonitrile and up to eight percent of another copolymerizable olefinic monomer by adding the monomers to an aqueous polymerization medium, the step of polymerizing in the presence of 0.05 to 0.20 percent by weight of total monomers of alkali metal salt of mahogany acids, and from 0.5 to 2.0 percent by weight of monomer of an alkali metal persulfate.

16. In a method of preparing a copolymer of at least 92 percent by weight of acrylonitrile and up to eight percent of vinyl acetate by aqueous medium polymerization method, the step of polymerizing in the presence of from 0.08 to 0.15 percent by weight of sodium salt of mahogany acids, and from 0.8 to 1.5 percent by weight of monomer of potassium persulfate, said percentages being based on the weight of the total monomers.

COSTAS H. BASDEKIS.

REFERENCES CITED

The following references are of record in the file of this patent:

UNITED STATES PATENTS

| Number | Name | Date |
|---|---|---|
| 2,462,354 | Brubaker | Feb. 22, 1949 |
| 2,486,241 | Arnold | Oct. 25, 1949 |
| 2,489,959 | Dunlap | Nov. 29, 1949 |